Aug. 17, 1965  M. K. STARK  3,200,641
PINION TORQUE ANALYZER
Filed Nov. 23, 1962
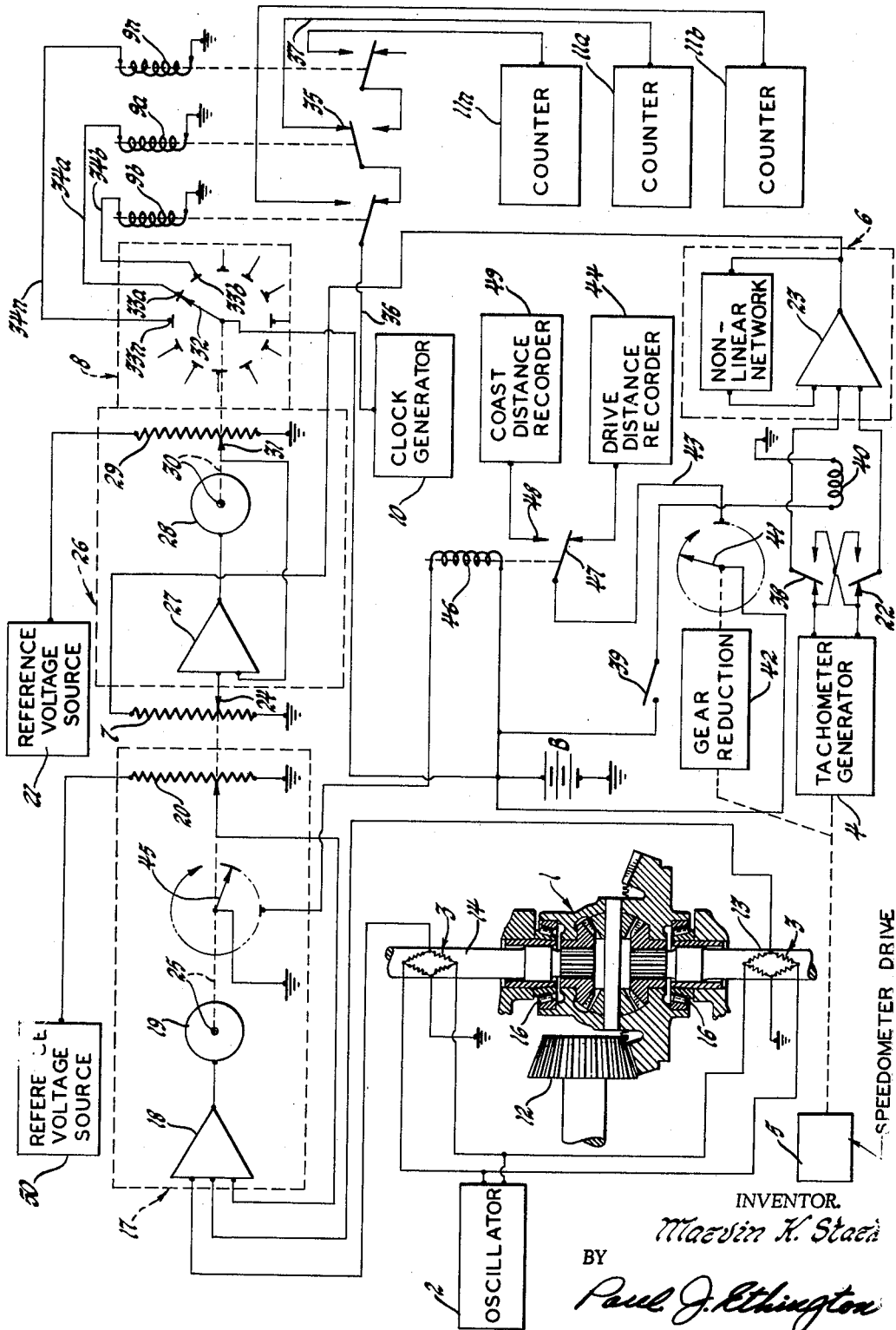
INVENTOR.
Marvin K. Stark
BY
Paul J. Ethington
ATTORNEY Patented Aug. 17, 1965

3,200,641
PINION TORQUE ANALYZER
Marvin K. Stark, Milford, Mich., assignor to General Motors Corporation, Detroit, Mich., a corporation of Delaware
Filed Nov. 23, 1962, Ser. No. 239,433
5 Claims. (Cl. 73—138)

The present invention relates to data translation and more particularly, to a system for determining the time duration of predetermined magnitudes of a varying quantity. It is especially adapted for obtaining data on effective pinion torque for use in automobile rear axle carrier bearing fatigue studies.

In order to design bearings for use in a given application, which will result in minimum size, weight and cost while giving satisfactory results for the life of the automobile, it is necessary to obtain information on the fatigue requirements of the bearings. Over a given period of vehicle operation, the total bearing fatigue is the product of the rate of fatigue and the time of operation. To obtain the rate of fatigue of carrier bearings, it is necessary to obtain information on the bearing speed and on the torque transmitted by the pinion to the rear axle. Under road load conditions, the torque and speeds vary continually. As a result, the bearings do not fatigue at a constant rate over the time of operation. To obtain a single rate of fatigue for a bearing operating under varying values of torque and speed, the instantaneous torque values at their various operating speeds must be converted to a constant speed basis. To convert a torque value at a given speed to an equivalent torque at a selected constant speed the torque value is divided by a speed factor. The speed factor represents the relationship between the fatigue effect of the torque at the operating speed and at the selected constant speed and in the case of rear axle carrier bearing may be empirically expressed as $$Fn = \left(\frac{Nc}{N}\right)^{3/10}$$

where:

$Fn$ = speed factor
$Nc$ = selected constant speed
$N$ = operating speed

These equivalent torque values are termed the effective torque and represent the same fatigue rate as the pinion torque at operating speed.

The present invention is adapted for use in combination with a motor vehicle power train for obtaining the time duration of various levels of effective torque transmitted by the pinion to the rear axle.

In accordance with this invention, signal generating means are employed to develop a signal corresponding to the instantaneous actual torque necessary to drive the vehicle. A second signal generating means is employed to develop a signal corresponding to the reciprocal of the speed factor. These two signals are then fed to multiplying means for obtaining the product of the two signals and for developing an output corresponding to the effective pinion torque. This output signal is then used to drive a servomechanism coupled to distributing means which act as an effective torque level distributor. The signal from the effective torque level distributor directs the output of pulse generating means which actuates counting means for obtaining the time duration of each of the torque levels.

A more complete understanding of the invention may be had from the detailed description which follows taken with the accompanying single figure of the drawings which shows a diagrammatic illustration of an embodiment of the invention.

Referring now to the drawings, there is shown an illustrative embodiment of the invention in a system for use in carrier bearing fatigue studies. The system determines the time duration of predetermined magnitudes of effective torque necessary to drive the automobile. In general, the system comprises an automobile differential generally designated 1. A source of electrical power such as an oscillator 2 is connected to strain gages 3 which are attached to the rear axles of the differential for developing a signal corresponding to instantaneous pinion torque. Signal generating means comprising a tachometer generator 4 and a function generator 6 develop a signal corresponding to the reciprocal of the speed factor. These two signals are then fed to a multiplying potentiometer 7 for obtaining the effective pinion torque signal. A commutator assembly 8 responsive to the effective torque signal energizes one of a plurality of relays 9a, 9b, . . . 9n depending on the magnitude of the signal. The relays are effective to direct the output of a one pulse per second clock generator 10 to one of a plurality of digital counters 11a, 11b, . . . 11n depending upon the relay energized.

The differential is the conventional type used on present-day automobiles for operatively connecting the drive pinion 12 to the rear axles 13 and 14. The differential is supported in the carrier by two tapered roller bearings 16. The rear axles 13 and 14 are wired with strain gages 3 to measure the instantaneous torque necessary to drive the vehicle. The axle torque signals are picked up by slip ring assemblies, not shown, mounted on the ends of the axle shafts.

In order to produce a signal representative of the total instantaneous pinion torque, the torque signals are fed from each of the slip ring assemblies to a servomechanism 17. The servomechanism is of the conventional closed loop type comprising a summing amplifier 18, a servomotor 19, and a potentiometer 20. The potentiometer 20 has an A.-C. voltage source 50 applied thereto. The A.-C. voltage source 50 is in phase with oscillator 2.

To develop a signal corresponding to the reciprocal of the speed factor, a tachometer generator 4 and a function generator 6 are provided. The tachometer generator 4 is driven by the automobile speedometer drive 5 to produce a signal corresponding to the instantaneous speed of the pinion. This signal is fed through a reversing switch 22 to the function generator 6 comprising a high gain operational amplifier 23 with nonlinear feedback for obtaining the reciprocal of the speed factor. For example, if 500 r.p.m. is used as the speed base, then the function generator would divide the instantaneous speed by 500 and raise the quotient to the $3/10$ power.

The instantaneous values of effective torque are developed by multiplying the total instantaneous pinion torque signal by the signal corresponding to the reciprocal of the speed factor. For this purpose a multiplying potentiometer is provided. The output of the function generator represents a varying input to the multiplying potentiometer 7 having a wiper 24. The wiper 24 is driven by the shaft 25 of the servomotor 19 and applies the instantaneous torque input to the multiplying potentiometer. The output in the multiplying potentiometer 7 is fed to a second servomechanism generally designated 26. The servomechanism 26 is also of the closed loop type comprising an amplifier 27, a servomotor 28, and a potentiometer 29. The potentiometer 29 has the D.-C. voltage source 21 applied thereto.

In order to record the time duration of the different levels of effective torque gating, pulse generating and counting means are provided. The shaft 30 of motor 28, in addition to driving the potentiometer wiper 31, drives the wiper 32 of the commutator assembly 8. The commutator assembly has a plurality of fixed contacts 33a, 33b, . . . 33n corresponding to predetermined positions of shaft 30. Relays 9a, 9b, . . . 9n are selectively energized by the commutator assembly 8 through conductors 34a, 34b, . . . 34n for directing the output of a clock generator 10 to one of a plurality of digital counters 11a, 11b, . . . 11n. If, for example, the magnitude of the effective torque is of such a value to energize relay 9a as indicated in FIGURE 1, then the relay armature will be pulled upward to engage contact 35. This will provide a path for the pulses from the clock generator through conductor 36, contact 35, conductor 37 to digital counter 11a which will record the time duration of this particular magnitude of effective torque.

It is desirable to maintain the input to the function generator of a constant polarity upon reversal of rotation of the rear axle. This is accomplished by means of the reversing switch 22. When the rear axles are to be operated in a reverse direction, the manual switch 39 is closed placing the battery B across the coil 40 thereby actuating the armature 38 so that the signal input to the function generator is of the same polarity regardless of the direction of rotation of the rear axles.

In order to record the distance traveled with a driving torque applied to the rear axle and the distance traveled with the vehicle coasting, there is provided a contactor 41 which is coupled to the speedometer drive through a gear reduction 42 and provides pulses at 1/10 mile intervals through the conductor 43 to the drive distance recorder 44. A contactor 45 is coupled to the shaft 25 of the servomotor 19 and is operative to place battery voltage across the relay 46 under a condition of zero pinion torque. When the relay 46 is energized, the relay armature 47 is pulled up to engage contact 48 and direct the pulses from the contactor 41 to the coast distance recorder 49.

The operation of the pinion torque analyzer is as follows. Signals corresponding to instantaneous values of pinion torque are developed by the strain gages 3 which are connected across an oscillator 2. These signals are added in the summing amplifier 18 which supplies the input to the servomotor 19. The servomotor 19 drives the wiper 24 of multiplying potentiometer 7 thereby supplying the instantaneous total pinion torque input to the multiplying potentiometer. The tachometer generator 4 is coupled to the speedometer drive 5 and develops a signal corresponding to the instantaneous pinion speed. This signal is applied through a reversing switch 22 to a function generator 6 which develops a signal corresponding to the reciprocal of the speed factor. The output of the function generator 6 and the output of the servomechanism 17 are combined in the multiplying potentiometer 7 which develops an output corresponding to instantaneous values of effective torque. The output of the multiplying potentiometer supplies the input to a servomechanism 26 to develop a motion output which drives the wiper 32 of the commutator assembly 8 thus energizing one of a plurality of relays 9a, 9b, . . . 9n depending on the position of wiper 32. As each relay is energized, its respective armature will be pulled-in to connect the clock generator to the appropriate counter. The time duration of each of the selected levels of effective torque will thereby be recorded.

When the vehicle is to be operated in the reverse direction, the switch 39 is closed energizing relay 40 thereby actuating the armature 38 in order to apply a constant polarity signal to the function generator 6.

The commutator assembly 41 which is coupled to the speedometer drive will provide pulses at 1/10 mile intervals to either the drive or coast distance recorders depending upon the operation of relay 46. Relay 46 is connected across the battery B through the commutator assembly 45. In its de-energized condition the armature 47 of relay 46 connects the drive distance recorder to the source of pulses. Under a condition of zero pinion torque, the relay 46 will be energized through commutator assembly 45 and the armature 47 will connect the coast distance recorder to the source of pulses.

The versatility of the instrument permits the analysis of the fatigue rate of any part of the power train. Where another exponential basis exists, modification of the function generator can be made to accommodate the relationship.

Although the description of this invention has been given with respect to a particular embodiment, it is not to be construed in a limiting sense. Many variations and modifications within the spirit and the scope of the invention will now occur to those skilled in the art. For a definition of the invention, reference is made to the appended claims.

I claim:
1. Apparatus for obtaining data on carrier bearing fatigue in a motor vehicle drive train including a differential having a driven gear connected with a propeller shaft and a driving pinion connected with an axle, said apparatus comprising means for generating a first electrical signal corresponding to the instantaneous actual torque transmitted from said pinion to said axle, means for generating a second electrical signal corresponding to the instantaneous actual speed of said pinion, multiplying means for obtaining the product of said first and second signals to develop an output signal corresponding to the instantaneous effective torque transmitted from said pinion to said axle, pulse generating means for generating pulses at a predetermined time interval, pulse counting means, circuit means interposed between said pulse generating means and said pulse counting means and adapted when actuated to transmit the pulses to said pulse counting means, distributing means responsive to said output signal for actuating said circuit means.

2. Apparatus for obtaining data on carrier bearing fatigue in a motor vehicle drive train including a differential having a driven gear connected with a propeller shaft and a driving pinion connected with an axle, said apparatus comprising bridge circuit means attached to said axle and energized by a source of electrical power for developing a first signal corresponding to the instantaneous actual torque transmitted from said pinion to said axle, speed responsive means for developing a second signal corresponding to the instantaneous actual pinion speed, multiplying means responsive to said first and second signals for developing a varying output signal corresponding to the product of said signals, pulse generating means for generating pulses at a predetermined time interval, a plurality of pulse counters, distributing means responsive to said output signal and having a plurality of output terminals corresponding to predetermined magnitudes of said output signal, switching means associated with each of said pulse counters and connected to each of said output terminals and selectively energized through said distributing means by said output signal for connecting said pulse generating means to the associated pulse counter.

3. In combination, a motor vehicle drive train including a differential having a driven gear connected with a propeller shaft and a driving pinion connected with an axle, means for generating a first electrical signal corresponding to the instantaneous actual torque transmitted from said pinion to said axle, means for generating a second electrical signal corresponding to the instantaneous actual speed of said pinion, multiplying means for obtaining the product of said first and second signals to develop an output signal corresponding to the instantaneous effective torque transmitted from said pinion to said axle, a servomechanism responsive to said output signal for developing a displacement output, a commutator assembly driven by said displacement output, pulse generating means for generating pulses at a predetermined time interval, a plurality of pulse counters, switching means associated with each of said pulse counters selectively energized through said commutator assembly upon the occurrence of predetermined values of said displacement output for connecting said pulse generating means to the associated pulse counter.

4. Apparatus for obtaining data on rear axle carrier bearing fatigue in a motor vehicle drive train including a differential having a driven gear connected with a propeller shaft and a driving pinion connected with said rear axle, said apparatus comprising bridge circuit means attached to said axle and energized by a source of electrical power for developing a first signal corresponding to the instantaneous actual torque transmitted from said pinion to said axle, speed responsive means associated with the motor vehicle speedometer drive for developing a second signal corresponding to the instantaneous actual pinion speed, said means comprising a tachometer generator, a function generator, switching means interposed between said tachometer generator and said function generator for reversing the output of said tachometer generator when said speedometer drive is rotating in a reverse direction, multiplying means responsive to said first and second signals for developing an output signal corresponding to the product of said first and second signals, a servomechanism responsive to said output signal for developing a displacement output, a commutator assembly driven by said displacement output, pulse generating means for generating pulses at a predetermined interval of time, a plurality of pulse counters, switching means associated with each of said pulse counters selectively energized through said commutator assembly upon the occurrence of predetermined values of said displacement output, for connecting said pulse generating means to the associated pulse counter.

5. In combination, a motor vehicle drive train including a differential having a driven gear connected with a propeller shaft and a driving pinion connected with an axle, a plurality of strain gages attached to said axle and energized by a source of electrical power for developing a first signal corresponding to the instantaneous actual torque transmitted from said pinion to said axle, speed responsive means associated with the motor vehicle speedometer drive for developing a second signal corresponding to the instantaneous actual pinion speed, said means comprising a tachometer generator, a function generator, switching means interposed between said tachometer generator and said function generator for reversing the polarity of the output of said tachometer generator when said speedometer drive is rotated in a reverse direction, a multiplying potentiometer having a wiper, circuit means for applying said second signal to the input of said potentiometer, a first servomechanism responsive to said first signal for positioning said wiper of said multiplying potentiometer, whereby said multiplying potentiometer develops an output signal which is the product of said first and second signals and corresponds to the instantaneous effective torque transmitted from said pinion to said axle, a second servomechanism responsive to said output signal for developing a displacement output, a commutator assembly driven by said displacement output, pulse generating means for generating pulses at a predetermined interval of time, a plurality of pulse counters, relay means associated with each of said pulse counters and selectively energized through said commutator assembly upon the occurrence of predetermined values of said displacement output for connecting said pulse generating means to the associated pulse counter, distance recording means comprising first and second digital counters, second pulse generating means, second relay means adapted to connect said second pulse generating means to said first digital counter when said second relay is in a de-energized condition, a second commutator assembly coupled to said first servomechanism and adapted to energize said second relay means when zero torque is being transmitted from said pinion to said axle, thereby connecting said second pulse generating means to said second digital counter.

References Cited by the Examiner

UNITED STATES PATENTS

| | | | |
|---|---|---|---|
| 2,150,776 | 3/39 | Moles | 324—70 X |
| 2,351,707 | 6/44 | Rouprich | 324—70 |
| 2,434,349 | 1/48 | Cohen | 324—70 |
| 2,807,417 | 9/57 | Farrell | 235—95 |
| 2,912,163 | 11/59 | Van Tuyl | 73—343.5 X |
| 2,946,646 | 7/60 | Bower et al. | 324—70 X |
| 3,035,443 | 5/62 | Gray | 73—343.5 |

RICHARD C. QUEISSER, *Primary Examiner.*

JOSEPH P. STRIZAK, *Examiner.*